Dec. 8, 1959 R. H. KLIE 2,916,708

OVERLOAD PROTECTION CIRCUIT

Filed May 22, 1957

INVENTOR
R. H. KLIE
BY W L Keefauver
ATTORNEY 2,916,708

OVERLOAD PROTECTION CIRCUIT

Robert H. Klie, Chatham, N.J., assignor to Bell Telephone Laboratories, Incorporated, New York, N.Y., a corporation of New York Application May 22, 1957, Serial No. 660,919
6 Claims. (Cl. 333—18)

This invention relates to overload protection for signal wave transmission systems and, more particularly, to protection of components of a signal wave transmission system from overload damage resulting from excessive transmission deviations in the system.

It is well known that many transmission and translating devices in a communication system produce distortion of the transmitted signal. In a repeatered submarine cable transmission system, for example, each repeater is designed to have a gain characteristic which matches the loss characteristic of the preceding section of cable and thus to transmit a substantially undistorted signal. However, it is impossible to design circuits which exactly match the cable losses and, hence, near approximations must be used. The actual difference between these gain and loss characteristics is termed the transmission deviation for that particular portion of the transmission system. These transmission deviations in a long transmission system are cumulative, resulting not only in loss of quality or fidelity of the signal, but also in a danger of overload and serious damage to the components of the system. These deleterious effects are made even more troublesome because the transmission deviations of a system may vary with time due to changes in temperature, age and many other factors.

Equalization schemes have been devised whereby the ultimate output signal from a transmission system is reasonably free from distortion. However, unless the equalizers are distributed throughout the system, the danger of overload at some point in the system remains just as great and hence requires some type of safeguard. In submarine cable systems, for example, it is not economically feasible to provide distributed equalization which is at the same time adjustable throughout the life of the system. It has therefore been customary to reduce the level of the input signal and to operate the components at levels well below the maximum safe value in order to insure an adequate margin of safety should the transmission deviations cumulate and become excessive. This lower signal level, of course, reduces the signal-to-noise ratio of the system and thereby adversely affects the fidelity of the output signal. These difficulties increase and, in some cases, become insurmountable when it is desired to transmit broadband signals, for example, television signals, over the transmission system.

It is therefore an object of the present invention to protect signal wave transmission systems from damage resulting from excessive transmission deviations in the system.

It is a more specific object of the invention to provide overload protection for signal wave transmission systems which is easily accessible for adjustment throughout the life of the system.

It is another object of the invention to increase the signal-to-noise ratio of signal wave transmission systems without increasing the danger of overload due to excessive transmission deviations of the system.

In accordance with the present invention, a signal to be transmitted over a signal wave transmission system is predistorted before transmission by a network having a transmission characteristic which is substantially identical to the accumulated transmission deviations of the system from its input to the point of maximum accumulated transmission deviations at all frequencies of interest. This predistorted signal is clipped by means of a voltage limiter to remove all voltage peaks in excess of a preselected threshold which might cause overload of the system components. The predistorted and clipped signal is then passed through a second network having a transmission characteristic which is inverse with respect to that of the first network. The effect of the second network is to remove the distortion introduced by the predistortion network and thereby restore the clipped signal to its original undistorted form except for the time duration of the comparatively few peaks removed by the limiter. When this signal now passes through the transmission system, the transmission deviations do not cause peaks of sufficient amplitude to cause overload. Equalization to retain the fidelity of the signal may be carried on in the usual manner if the equalizing circuit parameters are taken into account by the overload protection circuits.

One of the major advantages of the present invention resides in the fact that the above-described protection circuits can be placed at one end of a transmission system and thus be easily accessible for adjustments throughout the life of the system. This is particularly advantageous for long submarine cable systems such as trans-oceanic cable systems.

Another advantage of the invention resides in the increased signal level at which the input may be maintained without danger of overloading. This increases the signal-to-noise ratio of the entire transmission system and thereby improves its overall operating characteristics.

These and other objects and features, the nature of the present invention and its various advantages, will appear more fully upon consideration of the accompanying drawings and of the following detailed description of the drawings.

Figure 1:
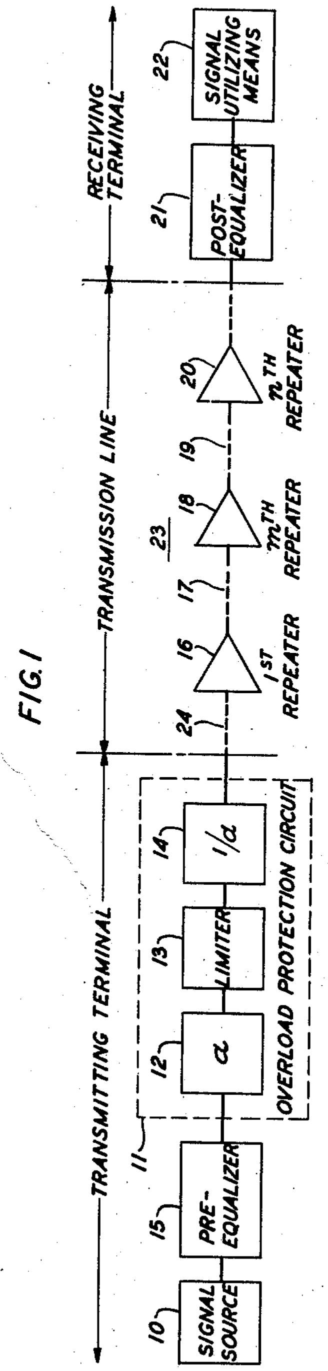
Fig. 1 is a schematic representation of a signal wave transmission system having an overload protection circuit in accordance with the principles of the invention.
Figure 4:
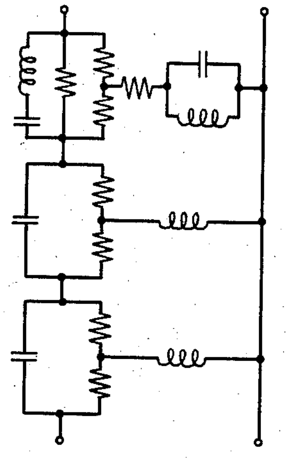
Figure 5:
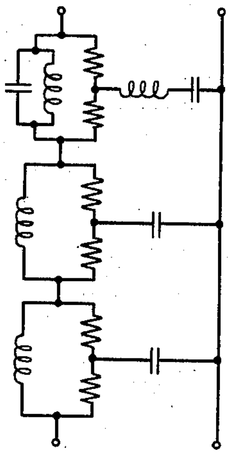
Figure 3A:
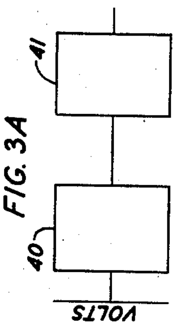
Figure 3B:
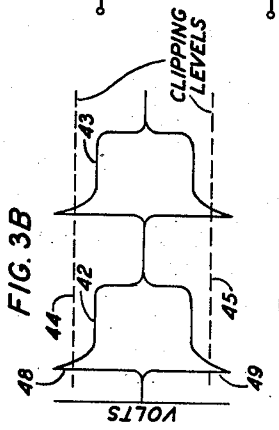
Figure 3C:
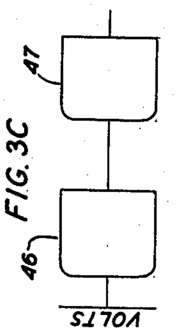

Figs. 3A through 3C, given for the purposes of illustration, show the effects of various portions of the overload protection circuit on the envelope of a transmitted radio frequency pulse; and Figs. 4 and 5 are schematic representations of typical circuit arrangements for producing the desired transmission characteristics of the networks 12 and 14, respectively, of Fig. 1.

In Fig. 1 is shown a schematic diagram of a signal wave transmission system having an overload protection circuit in accordance with the present invention. This transmission system comprises a signal source 10 which may be a source of multifrequency signals such as, for example, frequency multiplexed telephone signals or a television signal. Connected to a signal source 10 is a pre-equalizing circuit 15 which, in turn, is connected to an overload protection circuit 11. Overload protection circuit 11 comprises a network 12 producing the same signal amplitude peaks as a portion of the transmission line in the system. Network 12 therefore has a transmission characteristic, for example, a gain and/or phase versus frequency characteristic, similar to that of a portion of the transmission line. This characteristic is represented by "$\alpha$" and will be more fully explained below. Connected to network 12 is a limiter 13 which clips, i.e., removes, any voltage peaks appearing in the output of network 12 which exceed a predetermined maximum value. Limiter 13 may be any one of the well known voltage limiter arrangements but is preferably an extremely rapid acting circuit capable of clipping peaks of short duration without otherwise distorting the signal.

Connected to limiter 13 is a second network 14 having a gain versus frequency characteristic which is inverse with respect to that of network 12. That is, each series arm capacitor of network 12 is replaced by a shunt arm inductor in network 14; each series arm inductor in network 12 is replaced by a shunt arm capacitor in network 14; each series arm combination of an inductor and a capacitor in series in network 12 is replaced by a shunt arm combination of a capacitor and an inductor in parallel in network 14; and so forth. This inverse characteristic is represented by "$1/\alpha$."

In the absence of limiter 13 the effect of network 14 would be to restore the signal to exactly the same condition which existed prior to entering network 12. With limiter 13 in the circuit, however, some slight distortion remains in the signal after leaving network 14 but overload protection is achieved.

After leaving overload protection circuit 11, the signal enters the transmission line 23 which may comprise a number of spaced repeaters including repeaters 16, 18 and 20 and sections of transmission line 24, 17 and 19. Repeater 16 is the first repeater of the transmission line. Repeater 18, termed the *m*th repeater, is that repeater at which the transmission deviations of the transmission line 23 have accumulated to the maximum value. This will be explained more fully below. Repeater 20 is the last repeater of the transmission line 23 and is termed the *n*th repeater. In certain systems the *m*th and the *n*th repeaters may be one and the same as explained below. Connected to transmission line 23 is a post-equalizing circuit 21 which removes any signal distortions which may not have been compensated for by pre-equalizing circuit 15. Connected to post-equalizing circuit 21 is signal utilizing apparatus 22. This apparatus utilizes whatever signal is transmitted from signal source 10. If, for example, the signal delivered by source 10 is a number of frequency multiplexed telephone signals, utilizing circuit 22 demodulates the received signal and routes each individual channel signal to the proper receiver.

In order to understand the operation of overload protection circuit 11 in the transmission system of Fig. 1 more fully, the cause and effects of transmission deviations will now be discussed.

In a long transmission system, such as a submarine cable system, each repeater of the transmission line is designed to have a gain characteristic which matches the loss characteristic of the immediately preceding section of cable. If this were accomplished precisely throughout the transmission system, the signal delivered at the end of the transmission system would be an exact replica of the signal introduced into the system. The limitations of components and design techniques, however, make an exact match of gain and loss characteristics impossible. Compromises must be made which result in a failure to produce an exact match. The difference between the gain characteristic of a repeater and the loss characteristic of the immediately preceding section of line, that is, the mismatch, is called the transmission deviation for that particular section of line. Each repeater-line section has its own particular transmission deviation which deviations are generally the same throughout the transmission line, but which may be substantially different due to local damage or failure of parts.

In long transmission systems, such as submarine cable systems, the individual transmission deviations may add together or accumulate to such an extent that the signal becomes unduly distorted. These distortions may result in excessive voltage peaks appearing in portions of the transmitted signal. If these peaks are sufficiently high, permanent damage may be caused to the transmission line or to the components of the individual repeaters. The present invention is concerned with transmission systems in which the transmission deviations assume sufficient proportion to cause an actual danger of overload.

If the transmission deviation for each section of line is similar to the transmission deviation of every other section of line, a condition which is usually the case due to the use of a single design, the most deviated repeater will, of course, be the last repeater of the line. In this case the overall line characteristic can be actually measured and this characteristic be used to design network 12. If, however, because of a line fault, the failure of a nonessential component, or because of some unknown reason, the transmission deviations of all of the repeater-line sections are not substantialy similar, the point of maximum accumulated deviation may no longer be the receiving end of the transmission line. In this case, the transmission characteristic of the line from the transmitting terminal up to the point of maximum accumulated deviation must be determined either by measurements made while laying the cable or empirically from gain measurements of the individual repeaters, knowledge of the constants of the line, and an estimate of the nature and location of the fault or failure.

It should be further noted that the transmission deviations of a transmission line are directly dependent upon the loss characteristic of the line itself and the gain characteristics of the repeaters. It is well known that these characteristics tend to vary somewhat with such factors as aging, temperature, and so forth. The maximum accumulated transmission deviation of the system, therefore, also varies with these factors and the characteristics of networks 12 and 14 may, therefore, have to be changed from time to time.

Returning to Fig. 1, overload protection circuit 11 is designed so as to make overload of transmission line 23 or any component thereof, due to the transmission deviations of the line, virtually impossible. More specifically, network 12 has a transmission characteristic which exactly simulates the overall transmission characteristic of transmission line 23 from its input to the point of maximum deviation. This point is represented as the *m*th repeater 18, which is normally the same as the last repeater in the line but which may, due to random deviations, be any other repeater. The accumulated transmission deviations at the *m*th repeater may, as mentioned above, be determined empirically or by actual measurements if this is the last repeater. It can be seen, therefore, that the signal leaving network 12 has included therein all of the voltage peaks which would appear at repeater 18 if the signal were impressed directly upon transmission line 23. In limiter 13, those voltage peaks which are sufficiently high to form an actual danger of overload at repeater 18 are removed. The function of network 14 is to restore as nearly as possible the initial condition of the signal. The functions of these circuits may more readily be understood by considering Figs. 2 and 3A through 3C.

Figure 2:
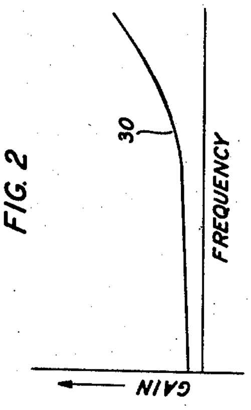
Fig. 2 is a graphical and qualitative representation of the gain versus frequency characteristic of a typical repeatered coaxial submarine cable transmission line.

In Fig. 2 is shown qualitatively, for the purposes of illustration, a typical gain versus frequency characteristic of a repeatered coaxial submarine cable transmission line. As shown by curve 30, the overall gain of such a transmission line tends to be somewhat greater for the high frequency ranges than for the lower frequency ranges. This disparity may, in some cases, become as great as 10 decibels or more. If should be understood, however, that the curve of Fig. 2 is only illustrative of one of the many possible overall gain characteristics, depending upon the age of the cable and components, the mean temperature of the transmission line, and many other factors.

In Figs. 3A through 3C are shown the effects of network 12, limiter 13 and network 14 upon a radio frequency pulse envelope. In Fig. 3A are shown two square wave envelopes 40 and 41 delivered by signal source 10 to network 12. In Fig. 3B are shown these same envelopes represented as 42 and 43 after passing through network 12. It is assumed here that the point of maximum accumulated deviation occurs at the receiving end of the transmission line, and that network 12 has a gain characteristic similar to that shown in Fig. 2. Network 12 may also have a phase versus frequency characteristic similar to that of transmission line 23 in Fig. 1. As can be seen in Fig. 3B, the effect of such a characteristic is, in many cases, to build up the leading edges of the square wave pulses and to round off the trailing edges. This build-up on the leading edges produces voltage peaks 48 and 49 which have a sufficient amplitude to overload the components of the transmission line. Limiter circuit 13 therefore removes these voltage peaks at levels 44 and 45. These levels are set at a sufficiently low amplitude so as to insure the necessary freedom from overload. Limiter circuit 13 may be a voltage limiting circuit such as, for example, the shunt feedback limiter disclosed in the copending application of J. W. Rieke, Serial No. 392,851, filed November 18, 1953.

In Fig. 3C there are shown the square wave pulse modulation envelopes 46 and 47 after passing through network 14. It can be seen that these wave forms are exact replicas of the initial wave forms shown in Fig. 3A except for a slight rounding of the leading edges of the pulses. This slight rounding is due to the clipping action shown in Fig. 3B and taking place in limiter circuit 13. The wave forms represented in Fig. 3C are now introduced into a conventional transmission line having the maximum accumulated deviation characteristic simulated by network 12. It can be seen, therefore, that even at the point of maximum accumulated deviation, the voltage peaks produced by these deviations are not of sufficiently high amplitude to overload the components of the system.

In the illustrative arrangements of the present invention, the entire overload protection apparatus for the transmission system is located adjacent the transmitting end of the line and is, in fact, incorporated in the transmitting terminal. The advantages of this placement are numerous, chief among them being the ease of maintenance and the adjustability of the overload protection apparatus throughout the life of the transmission system. This is particularly advantageous in the case of long submarine cable systems such as, for example, a transoceanic cable system extending thousands of miles in length and having components which are relatively inaccessible.

Another major advantage of this system is that the input signal supplied by source 10 may be maintained at a much higher level without fear of overloading the components of the transmission system. When transmitting television signals, for example, the effect of the clipping introduced by the present system would be to distort a few lines of a very few frames. This effect might well be undiscernible to the average viewer, and further, the increase in average signal level represents a significant increase in the signal-to-noise ratio of the transmission system.

In Figs. 4 and 5 are shown schematic representations of typical circuit arrangements which may be used for networks 12 and 14, respectively. In Fig. 4 is shown a network which, with suitably chosen component values, will have a transmission characteristic similar to that shown in Fig. 2, representing a repeatered submarine cable having its most deviated repeater at the receiving end terminal. In Fig. 5 is shown the inverse of the network shown in Fig. 4. While these networks represent one possible choice for use in the overload protection circuit 11 of Fig. 1, many other circuit arrangements would also be suitable, depending upon the characteristic to be reproduced. For example, both of these networks might be constant resistance adjustable networks such as that shown in H. W. Bode Patent 2,096,027, issued October 19, 1937. In any event, the first of these circuits must accurately represent the transmission characteristic of the transmission line from its input to the point of maximum accumulated deviation, and the second network should be the inverse of the first. The first network 12 may, however, be combined with the circuit of preequalizer 15 to form a single network performing the functions of both of these circuits. In this case, of course, the combined network would no longer be the inverse of network 14, but would perform the same function that network 12 would perform if it were there and, in addition, would do the pre-equalizing required.

In all cases it should be understood that the above-described arrangement is simply illustrative of the many possible specific embodiments which can represent applications of the principles of the invention. Numerous and varied other arrangements can readily be devised in accordance with these principles by those skilled in the art without departing from the scope of the invention.

What is claimed is:

1. An electric signal transmission system including arrangements for reducing or substantially eliminating the danger of overload by excessive signal peak amplitudes caused by the transmission characteristic of the transmission medium, said arrangements comprising a first network having a peak amplitude producing transmission characteristic substantially equivalent to said transmission medium characteristic, a voltage limiter connected to said first network and having a limiting threshold substantially lower than the overload limit of said transmission medium, and a second network connected to said voltage limiter and having a transmission characteristic inverse with respect to the transmission characteristics of said first network.

2. The transmission system according to claim 1 in which said transmission medium comprises a repeatered submarine cable system.

3. An overload protection circuit for a transmission system having a given gain versus frequency transmission characteristic and subject to overload by excessive signal peaks, said circuit comprising a first network having a transmission characteristic substantially identical to said given gain versus frequency transmission characteristic of said system, voltage limiting means connected to said first network for clipping signal peaks exceeding the voltage capacity of said transmission system, and a second network connected to said voltage limiting means and having a transmission characteristic inverse with respect to said given gain versus frequency transmission characteristic of said first network.

4. Overload protection means comprising first circuit means having substantially the same signal amplitude distorting characteristics as the signaling means to be protected, voltage limiting means connected to said first circuit means to clip excessive signal amplitudes, and second circuit means connected to said limiting means and having signal amplitude distorting characteristics inverse to those of said first circuit means.

5. In a signal transmission system having a transmitting terminal, a receiving terminal and a repeatered transmission line interconnecting said transmitting and receiving terminals, said transmission line having a transmission characteristic which is a function of frequency and being characterized by amplitude distortions which accumulate with respect to transmitted signals up to a point in said line of maximum accumulated amplitude distortion, said transmission system being subject to damage by applied signals causing amplitude distortions which exceed a predetermined safe overload magnitude, an overload protection circuit in said transmitting terminal which comprises in combination predistortion means having a transmission characteristic which is substantially the same as the transmission characteristic of said transmission line between said transmitting terminal and said point of maximum accumulated amplitude distortion, means for applying signals to be transmitted to said predistortion means, limiting means for limiting the predistorted signals to a magnitude below said predetermined overload magnitude, restoring means for removing from the limited signals substantially all the distortion introduced by said predistortion means and means for applying the restored signals to said repeatered transmission line.

6. The combination in accordance with claim 1 wherein said transmission line is characterized by amplitude distortions which accumulate and reach a maximum substantially at the receiving end of said line and wherein said predistortion means has a transmission characteristic substantially the same as the transmission characteristic of the entire transmission line.

References Cited in the file of this patent

UNITED STATES PATENTS 1,737,992 Bostwick -------------- Dec. 3, 1929